United States Patent [19]
Koziol

[11] Patent Number: 5,632,265
[45] Date of Patent: May 27, 1997

[54] GRILL MOUNTING ASSEMBLY

[75] Inventor: Walter Koziol, Antioch, Ill.

[73] Assignee: Modern Home Products Corp., Antioch, Ill.

[21] Appl. No.: 456,363

[22] Filed: Jun. 1, 1995

Related U.S. Application Data

[63] Continuation-in-part of Ser. No. 234,199, Apr. 26, 1994, abandoned.

[51] Int. Cl.⁶ ........................................... F24B 3/00
[52] U.S. Cl. .................. 126/30; 126/25 R; 126/41 R; 126/50
[58] Field of Search ................. 126/30, 25 R, 126/38, 40, 50, 29, 41 R

[56] References Cited

U.S. PATENT DOCUMENTS

| | | | |
|---|---|---|---|
| D. 206,977 | 2/1967 | Koziol | D81/10 |
| D. 221,112 | 7/1971 | Gunnels | D81/10 |
| D. 290,663 | 7/1987 | Jung | D6/337 |
| D. 325,490 | 4/1992 | Dodgen | D7/334 |
| D. 328,547 | 8/1992 | Dutro et al. | D7/332 |
| D. 329,624 | 9/1992 | Dodgen | D12/102 |
| 2,221,098 | 11/1940 | Langsam | 126/25 R |
| 2,780,474 | 2/1957 | Farah et al. | 126/25 R X |
| 2,860,570 | 11/1958 | Broome | 126/25 R |
| 3,298,361 | 1/1967 | Clark | 126/25 R |
| 3,447,445 | 6/1969 | Koziol | 99/421 |
| 3,692,013 | 9/1972 | Grafton et al. | 126/41 R |
| 3,693,534 | 9/1972 | Martin | 126/25 R |
| 3,789,822 | 2/1974 | Schantz | 126/25 R X |
| 4,403,596 | 9/1983 | Thomas | 126/30 X |
| 4,587,948 | 5/1986 | Haglund | 126/38 |
| 4,677,964 | 7/1987 | Lohmeyer et al. | 126/41 R |
| 4,681,083 | 7/1987 | Shu | 126/9 R |
| 4,686,958 | 8/1987 | Skelton et al. | 126/369.2 |
| 4,809,671 | 3/1989 | Vallejo, Jr. | 126/39 R |
| 4,886,045 | 12/1989 | Ducate, Jr. et al. | 126/41 R |
| 4,899,725 | 2/1990 | Barron, Jr. | 126/41 R |
| 4,966,125 | 10/1990 | Stephen et al. | 126/25 R |
| 5,070,776 | 12/1991 | Schlosser et al. | 99/450 |
| 5,076,252 | 12/1991 | Schlosser et al. | 126/41 R |
| 5,203,317 | 4/1993 | James | 126/25 R X |

OTHER PUBLICATIONS

Modern Home Products back cover of a 1993 Catalog showing the Gemini Multifunctional Cooking System.

*Primary Examiner*—Larry Jones
*Attorney, Agent, or Firm*—Quarles & Brady

[57] ABSTRACT

An assembly for mounting a barbecue grill and a cooking related device such as an additional grill, burner or table top, to a support structure such as a post or cart. The mounting device is especially suitable for gas barbecue grills and allows for various size grill units to be combined whether the two units are of the same size or different sizes. In one embodiment, only a single grill is utilized, and the area adjacent the grill is used as a working surface. In another embodiment, a single grill unit is employed, and the support surface adjacent the grill has an auxiliary burner. The mounting assembly is fabricated from few parts and permits ease of installation.

23 Claims, 4 Drawing Sheets

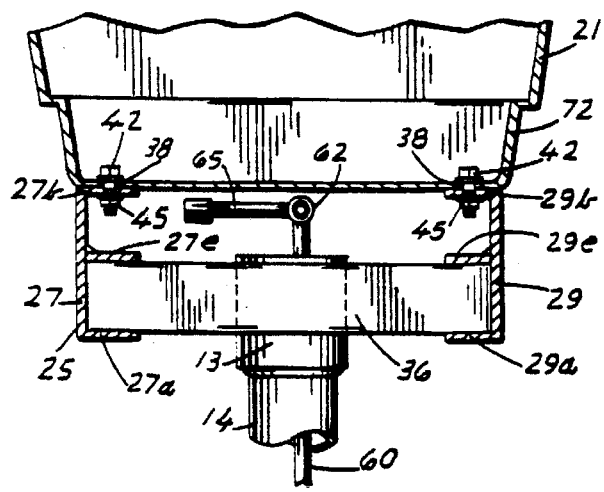
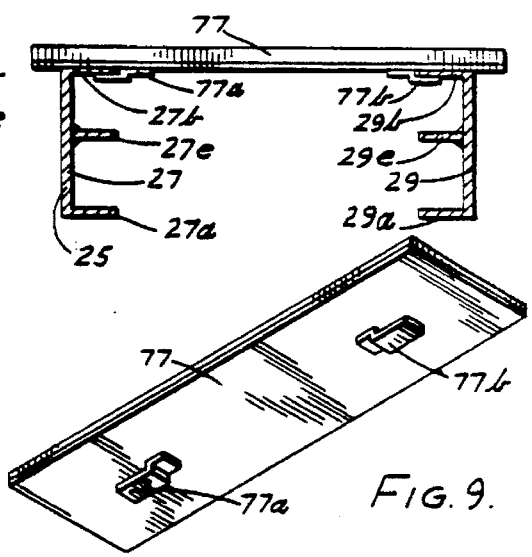
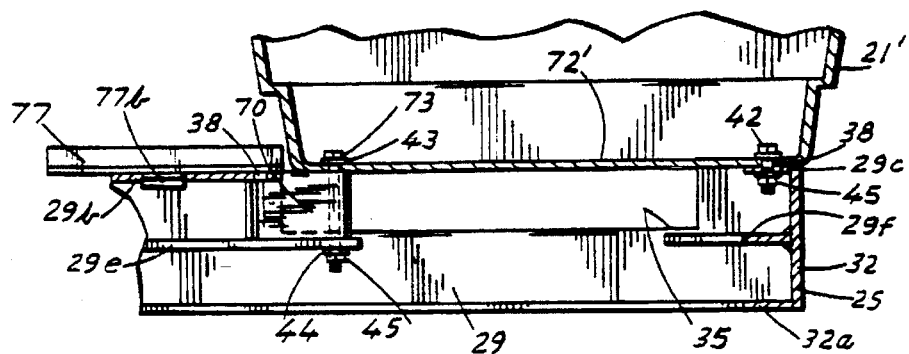

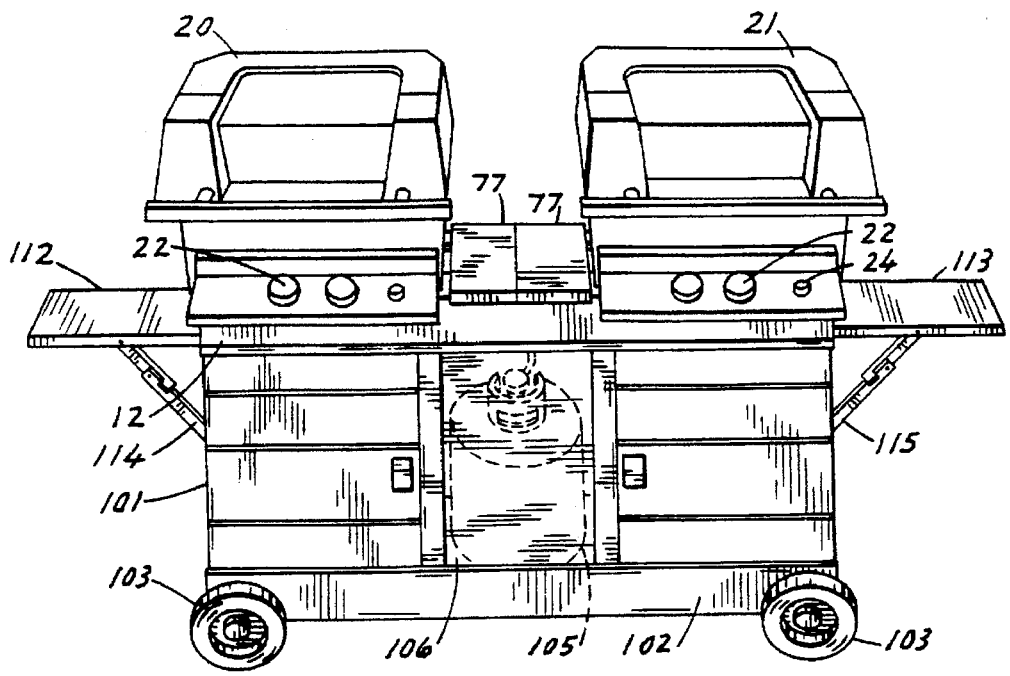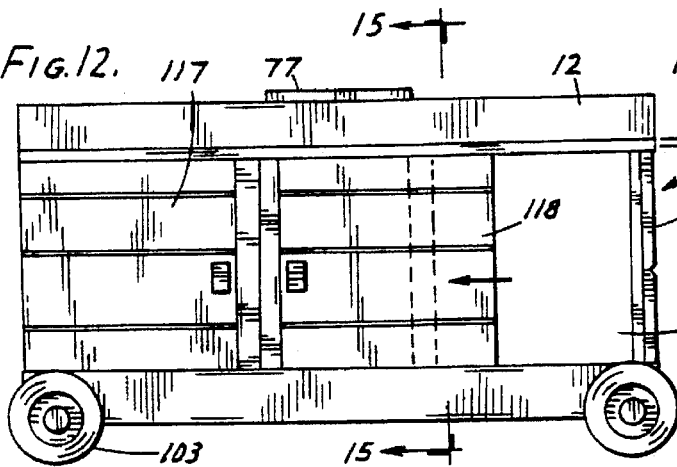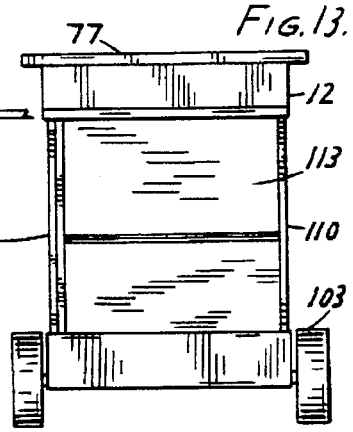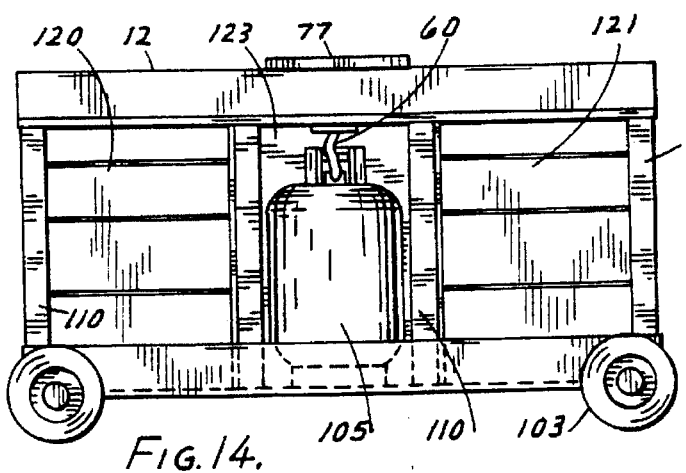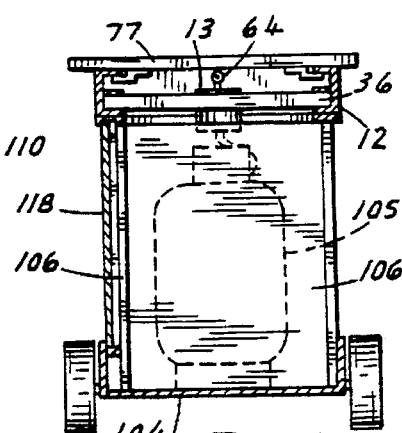

GRILL MOUNTING ASSEMBLY

CROSS REFERENCE TO RELATED APPLICATION

This is a continuation-in-part of application Ser. No. 08/234,199 filed Apr. 26, 1994, now abandoned.

BACKGROUND OF THE INVENTION

This invention relates to an assembly for mounting a barbecue grill to a support structure. More particularly, it relates to an assembly for mounting barbecue grill units of various sizes to a common gas supply post or cart.

The use of two barbecue grill units together is well known. For example, in U.S. Pat. No. 3,447,445, there is shown a dual barbecue grill unit which is joined by a common wall 24. While this unit satisfies many needs and offers versatility in barbecue cooking, it is expensive to manufacture especially from a tooling standpoint. Further, it does not offer size selection. For example, in many instances, it is desirable to have units of various sizes, as well as units which differ in size from each other. In other instances, it may be desirable to combine a gas barbecue grill unit with an auxiliary gas burner or with a working table surface.

In U.S. Pat. No. Des. 221,112, there is shown two barbecue grill units connected to a lamp post.

It is an advantage of the present invention to provide a mounting assembly for one or more barbecue grill units of various sizes to a support structure.

It is another advantage of the present invention to provide a mounting assembly of the foregoing type wherein gas barbecue grill units can be connected to a common gas supply support post in an economical manner.

It is still another object of the present invention to provide a mounting assembly of the foregoing type wherein barbecue grill units of different types and sizes and cooking related devices can be connected to a common support post or a portable cart.

It is yet another advantage of the present invention to provide a mounting assembly of the foregoing type wherein a barbecue grill unit can be connected to a support post with a burner unit or a table surface.

It is yet another advantage of the present invention to provide a mounting assembly of the foregoing type which affords an aesthetically appearing barbecue grill assembly.

SUMMARY OF THE INVENTION

The foregoing advantages are accomplished by the present assembly for mounting at least one barbecue grill unit and a cooking related device to a post member. The mounting assembly includes a support member, the support member having at least one first and second opposing base portion. The base portions are constructed and arranged to receive barbecue grill units of various sizes on the first base portion and a cooking related device on the second base portion. Means are provided to connect the support member to a support structure.

In one preferred embodiment, the barbecue grill unit is a gas barbecue grill and the support structure is a post having a gas supply conduit therein. A gas connection member affords connection to the gas barbecue grill.

In one aspect, there is a dividing wall disposed between the base portions, and the dividing wall receives a shelf member.

In another aspect, the base portions have flange members with apertures to receive connecting members and the apertures are positioned in one location to receive a gas barbecue grill of one size and in another location to receive a gas barbecue grill of another size.

In yet another aspect, the barbecue grills are of the same size.

In an alternate embodiment, the support member supports barbecue grills, at least one of which is charcoal fired.

In additional alternative embodiments, the support member supports a gas burner or a table surface on one base portion and a barbecue grill on the other.

In yet an additional alternative embodiment, the support member is connected to a movable cart apparatus.

BRIEF DESCRIPTION OF THE DRAWINGS

FIG. 7 is a sectional view taken along line 7—7 of FIG. 3.

FIG. 8 is a sectional view taken along line 8—8 of FIG. 3.

FIG. 9 is a bottom perspective view of one of the cover members shown in FIG. 1.

FIG. 10 is a sectional view taken along line 10—10 of FIG. 3.

FIG. 11 is a view similar to FIG. 3 showing barbecue grill units mounted on a portable cart member.

FIG. 12 is a front elevational view of the portable cart shown in FIG. 11.

FIG. 13 is a side elevational view of the portable cart shown in FIG. 12.

FIG. 14 is a rear elevational view of the portable cart shown in FIG. 12, and

FIG. 15 is a sectional view taken along line 15—15 of FIG. 12.

DESCRIPTION OF THE PREFERRED EMBODIMENTS

Figure 1:
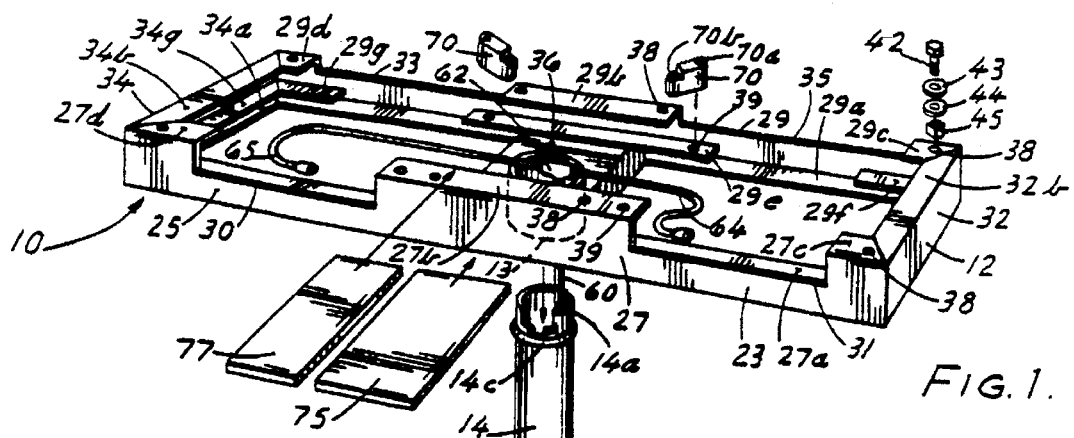
FIG. 1 is a top perspective view of the mounting assembly of this invention.

As seen in a detailed description of the present invention, and referring specifically to FIG. 1, the grill mounting assembly, generally 10, includes a support member 12 which is preferably fabricated from aluminum and has a centrally disposed collar 13 for attachment to post 14. This is effected by the collar 13 fitting over the connecting portion 14a and resting against the rib 14c. Suitable nuts, washers and bolts as later described make the connection. Post 14 fits into a pedestal base 16 such as by the connecting portion 14b and the raised rib 14c. The pedestal base can be attached to a supporting surface such as a deck by the placement of bolts through the holes 18.

Figure 3:
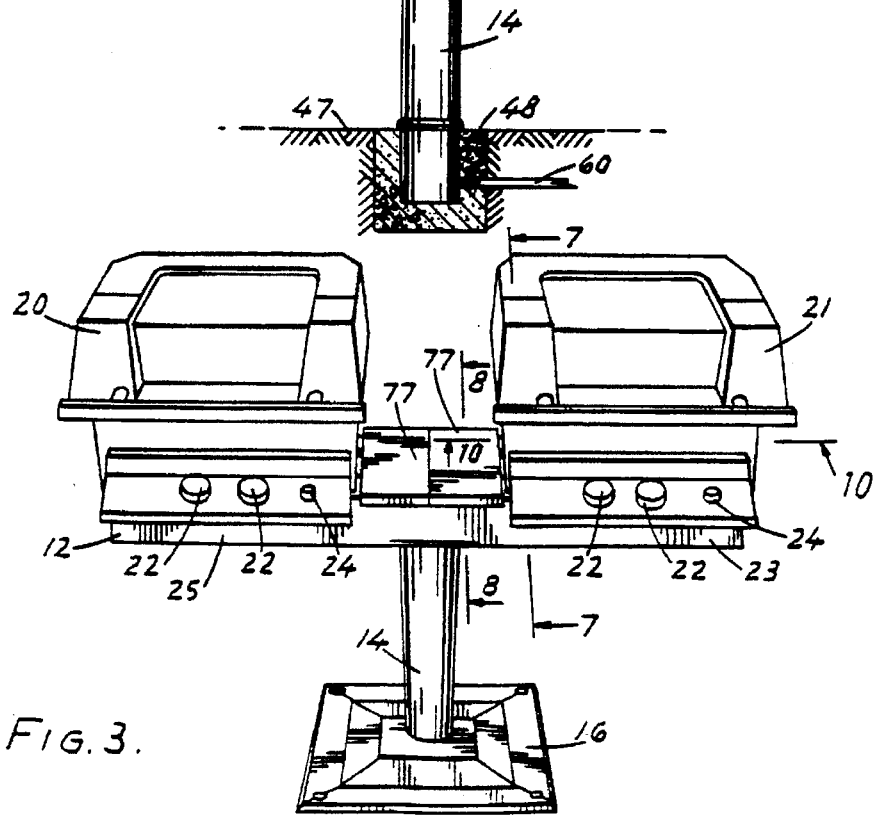
FIG. 3 is a top front perspective view showing two barbecue grill units mounted on the mounting assembly of FIG. 1.

The support member 12 has two base portions 23 and 25 formed by the front wall 27, the back wall 29 and the side walls 32 and 34. The front wall 27 has the two cut outs 30 and 31, and the back wall has complementary cut outs 33 and 35 to accommodate various geometric configurations of barbecue grill base portions. These cut outs accommodate the two gas barbecue grill units 20 and 21 as shown in FIG. 3. A multiplicity of flange portions extend from the front, back and side walls as seen in FIGS. 7, 8 and 10, as well as FIG. 1. Referring to these figures, it is seen that the support member 12 is connected to the collar 13 by the central section 36. This is effected by the flange portions 27a and 27e extending from the front wall 27, as well as the flange portions 29e and 29a extending from the back wall 29 and being welded thereto. There are also lower flange portions extending from the side walls such as shown at 34a in FIG. 1. Similarly, intermediate flanges extend from the rear wall 29 in addition to 29e as shown at 29g and 29f. Upper flange portions extend from the front wall 27 such as shown at 27b, 27c and 27d. Upper flanges also extend from the back wall 29 such as shown as 29b, 29c and 29d. Upper flange 32b extends from end wall 32, and 34b extends from end wall 34.

FIGS. 7 and 10 illustrate the attachment of the grill unit 21, as well as a unit 21' which is narrower in width by means of some of the previously described flanges. Referring specifically to FIG. 7, it is seen that the base 72 of grill unit 21 is attached to the base portion 25 by the bolts 42, washers 43 and 44, and nuts 45 (See also FIG. 1). These pass through suitable openings in the base of the grill and through openings 38 in flange portions 27b and 29b. The opposing side of the base portion would be attached in a similar manner through openings 38 in flange portions 27c and 29c.

FIGS. 10 and 1 illustrate the attachment of a shorter or smaller based grill 21' wherein the base portion 72', is secured at the front by the opening 39 in flange portion 27b and opening 38 in flange portions 27c. At the back, the attachment would be through opening 38 in flange portion 29c and opening 39 in flange portion 29e. In the latter instance, a spacer unit 70 would be employed through which a longer bolt 73 and nut 44 would be utilized and would pass through opening 70a and spacer 70. While a second opening 70b is shown in the spacer 70, it is preferably not used but could be in conjunction with opening 38 and a second bolt and nut connected therethrough as well as an opening in flange portion 29e (not shown). Similar attachments for different sized grill units would be made in conjunction with base portion 25.

Figure 4:
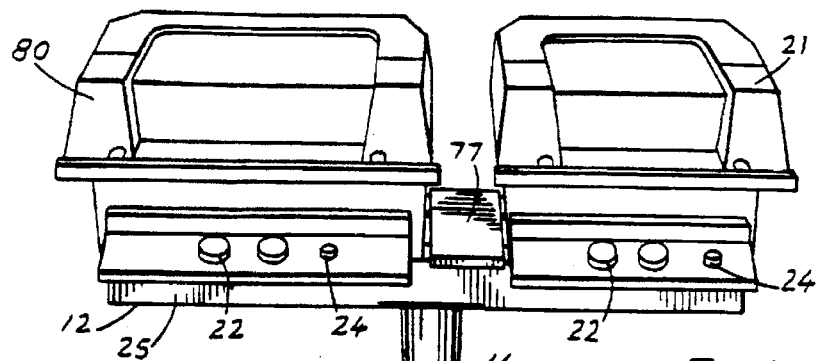
FIG. 4 is a view similar to FIG. 3 showing barbecue grill units of different sizes mounted on the grill mounting assembly.
Figure 6:
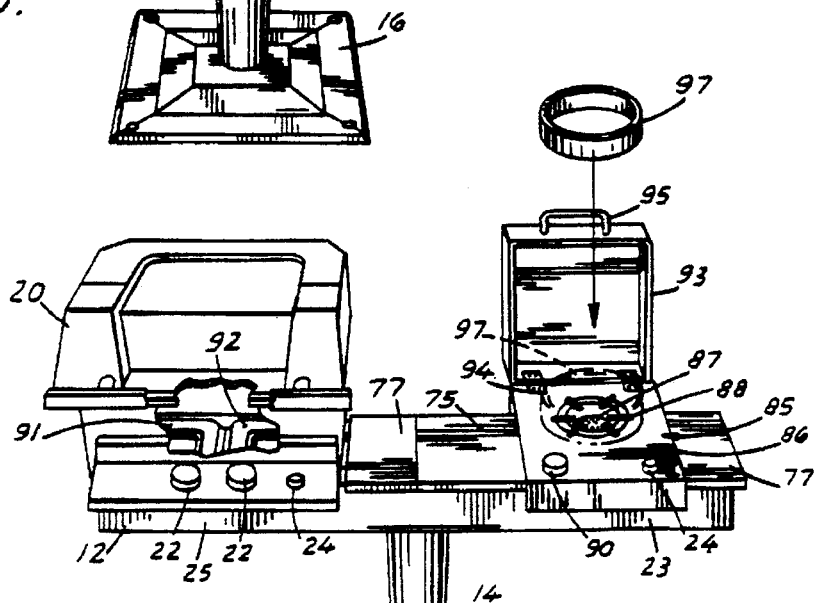
FIG. 6 is a view similar to FIG. 3 showing yet another embodiment.

It should be pointed out that the reason the back cut outs 33 and 35 are larger than the front cut outs 30 and 31 is to accommodate the rear tapering of different sized grill units. Cut outs 30 and 31 provide combustion air and clearance for the gas feed lines and the usual burner venturi tubes for front connection to the usual control valves which are controlled by the knobs 22 such as shown in FIGS. 3, 4 and 6. Cut outs 33 and 35 also provide combustion air but their main purpose is to provide mounting clearance.

As shown in FIG. 3, there are two cover units 77 placed between barbecue grill units 20 and 21. These serve as a working surface. As seen in FIG. 8, they are attached to the base portion 25 by the bottom flanges 77a and 77b slidably engaged with flanges 27b and 29b which serve as a supporting dividing wall between the grill units 20 and 21. The flange portions are best seen in FIG. 9.

Figure 2:
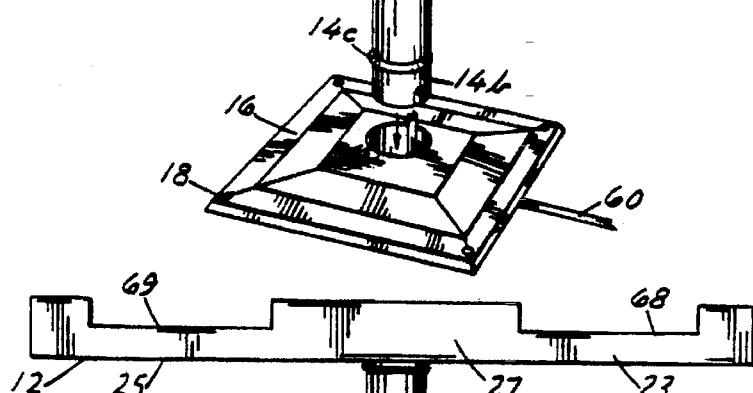
FIG. 2 is a front view of the grill mounting assembly showing the post mounted in the ground.

Turning back to FIG. 2, this embodiment illustrates a base portion 25 and the post 14 secured in the ground 47 by the concrete 48. Accordingly, any of the embodiments described herein can be utilized either with the post and pedestal as shown in FIG. 1 or directly into the ground as shown in this embodiment.

FIG. 4 illustrates the utilization of a larger grill unit 80 and a smaller grill unit 20. They are easily accommodated on the base portion 25 as previously described in conjunction with barbecue units 21 and 21' in FIG. 3. Note that the space between the two grills is accommodated by one smaller cover 77.

Figure 5:
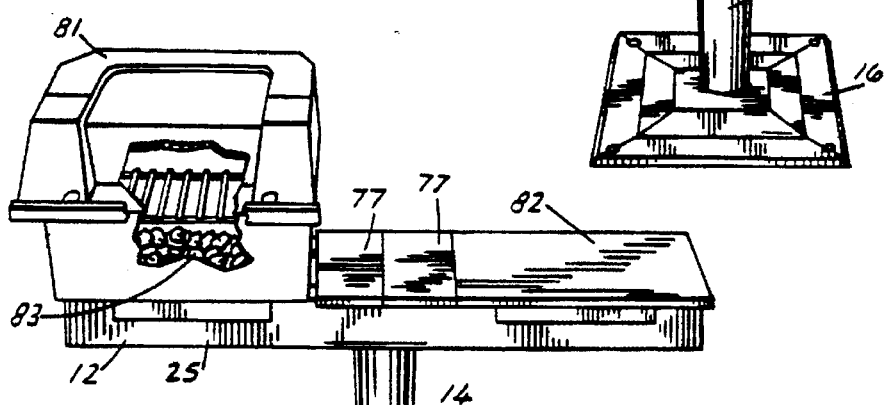
FIG. 5 is a view similar to FIG. 3 showing an alternative embodiment.

In FIG. 5, there is shown a barbecue grill 81 which is of the charcoal fuel type as seen by the charcoal 83. In place of a second barbecue grill, there is instead a table member 82 attached to the base portion 23. It can be attached in the same manner as previously described for cover units 77. Positioned between the table member 82 and the grill 81 are the two cover units 77 of the same size.

FIG. 6 illustrates yet another embodiment showing the gas barbecue grill unit 20 which is of the double burner unit type as seen by the burner units 91 and 92. These would be connected to the gas line 65 as shown in FIG. 1 which is connected to the main gas line 60 such as by the T connection 62. The gas to the burner units 91 and 92 will be controlled by the usual valves which in turn are controlled by the control knobs 22. The usual igniter knob is shown at 24 for igniting the fuel. In this particular embodiment, an auxiliary burner unit, generally 85, is utilized. It will have the usual base plate 86 with an opening to accommodate burner element 87 over which are placed the cooking utensil supports 88. While not shown, a base structure would be provided in the form of a rectangular box which would drop into base portion 23 and fit below the base plate 86 with the base plate resting in the cut outs 31 and 35 and on flange portions 29e and 29f (See FIG. 1). The burner unit 85 also has a control knob 90 for controlling gas through a valve to the burner element 87 as well as an igniter which is controlled by igniter knob 24. A cover is also provided at 93 which is hinged by the hinges 94 to the base plate 86, and a handle 95 is also included. An optional feature is a cooking ring 97 which can be placed over the supports 88 for wok cooking.

In this embodiment of FIG. 6, a larger cover unit 75 is employed with a smaller one 77 between the grill unit 20 and the burner unit 85. Cover unit 75 has the same bottom flanges as shown at 77a and 77b for cover unit 77.

FIGS. 11–15 show the same support member 12 with grill units 20 and 21, shown in FIG. 3, connected to a movable cart apparatus 101. Grill units 20 and 21 have the same control knob 22 and ignitor knob 24 and are separated by the previously described covers 77.

Cart 101 has the usual base portion 102 with four wheels 103 mounted thereon. A floor 104 forms a portion of the base portion 102 and supports the usual propane tank 105 which is centrally located and surrounded on three sides by the wall panels 106. However, the tank 105 is readily accessible from the back of the cart as shown in FIG. 14.

A suitable gas connection is made from the tank 105 by the gas line 60 in the manner previously described in conjunction with gas lines 64 and 65 shown in FIG. 1. Although a collar 13 is shown for attachment to a post, it is not used in this instance. Support member 12 is instead suitably connected to the cart 101 such as by welding it to the vertical frame members 110. Neither is the central section 36 required, although it provides for stability. Retaining collar 13 and central section 36 allow support member 12 to be used on the post 14 or the cart 101 without modification.

As seen in FIGS. 11–13, there are side shelves 112 and 113 hingedly attached to the sides of the support member 12 and the cart 101. These provide additional shelf space, as well as provide a gripping surface to move the cart 101. They are supported and collapsible along the sides of the cart by the interlocking yet releasable brace arms 114 and 115. Cart 101 also has sliding front doors 117 and 118 to provide access to the interior of the cart for storage purposes. These doors 117 and 118 cover the side portions 120 and 121 and are slidable over the central portion 123 with tank 105. This is illustrated in FIG. 12.

It will thus be seen that through the present invention there is now provided a mounting assembly for supporting barbecue grill units of various sizes on one portion of the mounting assembly, as well as a cooking related device or surface on the second base portion. The term "cooking related device" is meant to include additional barbecue grill units of various types and sizes, as well as an auxiliary burner or a table surface. The versatility of the mounting device is further seen in the fact that any horizontal space between the barbecue grills can be readily utilized as a working area, and the space filled in by cover units. No special tooling is required for producing the mounting assembly or special materials. Standard barbecue grill units and burner units are accommodated without any special adaptations. Further, the barbecue grills can be connected to various types of support structures.

Thus, the invention provides an improved mounting assembly for barbecue grills. While preferred embodiments have been described above, it should be readily apparent to those skilled in the art that a number of modifications and changes may be made without departing from the spirit and scope of the invention. For example, while double burner gas grill units have been described for use herein, it is readily apparent that a single burner unit could be employed instead. Further, while a gas grill unit has been utilized in conjunction with an auxiliary unit, it is apparent that a charcoal grill unit such as indicated at 81, could likewise be employed. Barbecue grill units which utilize both gas and charcoal are also becoming popular. These also can be readily accommodated because of the gas supply lines 64 and 65. While spacer units such as 70 have been indicated for supporting grill units, these could be eliminated and the frame structure modified with alternative holes to accommodate the various size grill units. Further, the cut out portions could also be eliminated as could flange portions 29f, 29g, 34g and 34a. However, a more rigid unit is provided with them. Also the specific materials mentioned are not the only materials which can be used. All such and other modifications within the scope of the invention are meant to be included herein.

I claim:

1. An assembly for mounting at least one barbecue grill unit and a cooking related device to a post member comprising:

a support member, said support member including at least one first and second opposing base portion, said base portions including at least one flange member and cut out section constructed and arranged to selectively receive and connect barbecue grill units of various sizes on said first base portion and cooking related devices of various sizes or a surface on said second base portion;

at least one of said base portions having a multiplicity of flange members for connection to said barbecue grill units, said flange members having apertures to receive connecting members, said apertures being positioned in one location to receive gas barbecue grill units of one size and in another location of said base portion to receive barbecue grill units of another size; and means to connect said support member to an essentially vertically disposed support post member between said base portions.

2. A mounting assembly for connecting at least one barbecue grill unit and a cooking related device to a post member comprising:

a support member, said support member including at least opposing base portions, one of said base portions including at least upper and lower flange members positioned at at least one of a front and back section of the base portion and a cut out section constructed and arranged to selectively receive and connect barbecue grill units of different sizes, a barbecue grill unit connected to one of said upper and lower flange members of said base portion and cooking related devices of various sizes connected to the other opposing base portion; and means connecting said support member to an essentially vertically disposed support post member between said base portions.

3. The assembly of claim 2 wherein the barbecue grill units are gas barbecue grill units and said post member has a gas supply conduit therein and further including a gas connection member connecting said gas barbecue grill units to said support post member.

4. The assembly of claim 3 wherein a second gas barbecue grill unit is connected to said other opposing base portion and further including a gas connection member for connection to said second gas barbecue grill unit.

5. The assembly of claim 3 wherein said cooking related device is a gas burner.

6. The assembly of claim 4 wherein said gas barbecue grill units are of the same size.

7. The assembly of claim 4 wherein said gas barbecue grill units are of different sizes.

8. The assembly of claim 2 wherein said post member includes a base portion for connection to a deck.

9. The assembly of claim 2 wherein said cooking related device is a table top.

10. A mounting assembly for connecting at least one barbecue grill unit and a cooking related device to a post member comprising:

a support member, said support member including at least one first and second opposing base portion, said first and second base portions including at least one flange member and cut out section constructed and arranged to selectively receive and connect barbecue grill units of different sizes, a barbecue grill unit connected to said first base portion and cooking related devices of various sizes connected to said second base portion;

means connecting said support member to an essentially vertically disposed support post member between said base portions, the barbecue grill units being gas barbecue grill units and said post member having a gas supply conduit therein;

a gas connection member connecting said gas barbecue grill units to said support post member; and a dividing wall disposed between said base portions, said dividing wall constructed and arranged to receive a cover member.

11. A mounting assembly for connecting at least one barbecue grill unit and a cooking related device to a post member comprising:

a support member, said support member including at least one first and second opposing base portion, said first and second base portions including at least one flange member and cut out section constructed and arranged to selectively receive and connect barbecue grill units of different sizes, a barbecue grill unit connected to said first base portion and cooking related devices of various sizes connected to said second base portion;

at least said base portion receiving said barbecue grill units having said cut out section;

a standoff member positioned between said base portion and a floor of said gas barbecue grill units; and means to connect said support member to an essentially vertically disposed support post member between said base portions.

12. An assembly for mounting at least one barbecue grill unit and a cooking related device to a post member comprising:

a support member, said support member including at least opposing base portions, one of said base portions including at least upper and lower flange members positioned at at least one of a front and back section of the base portion and a cut out section constructed and arranged to selectively receive and connect barbecue grill units of various sizes on said base portion with said flange members and cooking related devices of various sizes or a surface on said other opposing base portion;

means to connect said barbecue grill units to said flange members; and means to connect said support member to an essentially vertically disposed support post member between said base portions.

13. The assembly of claim 1 wherein the barbecue grill units are gas barbecue grill units and said post member has a gas supply conduit therein, and further including a gas connection member for connection to said gas barbecue grill units.

14. The assembly of claim 13 wherein said other opposing base portion is constructed and arranged to receive a second gas barbecue grill unit and further including a second gas conduit member for connection to said second gas barbecue grill unit.

15. The assembly of claim 14 wherein a dividing wall is disposed between said base portions.

16. The assembly of claim 13 wherein said other opposing base portion is constructed and arranged to receive a gas burner unit.

17. The assembly of claim 12 wherein said base portion with said flange members has opposing cut out sections to receive said gas barbecue grill units.

18. The assembly of claim 12 wherein the barbecue grill unit includes a charcoal burning barbecue grill unit.

19. An assembly for mounting at least one barbecue grill unit and a cooking related device to a support structure comprising:

a support member, said support member including at least opposing base portions, one of said base portions including at least upper and lower flange members positioned at at least one of a front and back section of the base portion and a cut out section constructed and arranged to selectively receive and connect barbecue grill units of various sizes on said base portion with said flange members and cooking related devices of various sizes or a surface on the other opposing base portion;

means to connect said barbecue grill units to said flange members; and means to connect said support member to a support structure.

20. The assembly of claim 19 wherein said support structure includes a post member.

21. The assembly of claim 19 wherein said support structure is a movable cart apparatus.

22. The assembly of claim 21 wherein the movable cart apparatus includes a central portion for a gas supply tank and adjacent side sections with sliding doors covering the side sections and slidable over the central portion.

23. The assembly of claim 19 wherein the barbecue grill units are gas grill units and the support member has a gas supply conduit therein, and further including a gas connection member for connection to said gas barbecue grill units.

* * * * *